US012718282B1

(12) United States Patent
Turner et al.

(10) Patent No.: US 12,718,282 B1
(45) Date of Patent: Aug. 25, 2026

(54) SYSTEM, METHOD, AND COMPUTER PROGRAM FOR MAINTAINING A CHECKLIST FOR A REGISTRY THAT ALLOWS THE ADDITION OF PRODUCTS FROM MULTIPLE UNRELATED MERCHANT SITES

(71) Applicant: Baby List, Inc., Oakland, CA (US)

(72) Inventors: Kristen Turner, San Francisco, CA (US); Aaron Smith, Las Vegas, NV (US); Harvey Fang, Los Angeles, CA (US); Alex Battaglino, San Francisco, CA (US)

(73) Assignee: Baby List, Inc., Emeryville, CA (US)

( * ) Notice: Subject to any disclaimer, the term of this patent is extended or adjusted under 35 U.S.C. 154(b) by 289 days.

(21) Appl. No.: 18/523,725

(22) Filed: Nov. 29, 2023

(51) Int. Cl.
*G06Q 30/00* (2023.01)
*G06N 20/00* (2019.01)
*G06Q 30/0601* (2023.01)

(52) U.S. Cl.
CPC ......... *G06Q 30/0633* (2013.01); *G06N 20/00* (2019.01)

(58) Field of Classification Search
CPC ............... G06Q 30/00; G06Q 30/0207; G06Q 30/0601; G06Q 30/0605
See application file for complete search history.

(56) References Cited

U.S. PATENT DOCUMENTS 6,611,814 B1 8/2003 Lee et al.
7,756,753 B1 7/2010 McFarland
7,877,289 B1 1/2011 Cunningham et al.
8,046,266 B1 * 10/2011 Geller ................ G06Q 30/0223 705/14.1
8,280,781 B1 10/2012 Pottier et al.
8,346,625 B2 1/2013 Song
8,510,145 B2 8/2013 Rowland
8,560,401 B1 10/2013 Bharara et al.
8,612,312 B1 12/2013 Edwards et al.
(Continued)

OTHER PUBLICATIONS

Niu, Xi, Chuqin Li, and Xing Yu. "Predictive analytics of E-commerce search behavior for conversion." (2017). (Year: 2017).*
(Continued)

*Primary Examiner* — Christopher B Seibert
(74) *Attorney, Agent, or Firm* — Lessani Law Group, PC

(57) ABSTRACT

The system enables a user to add products from a plurality of unrelated merchant sites to a registry and provides a registry checklist having a plurality of different product categories. The system maintains the checklist for the user by obtaining product metadata in response to a user adding a product to the registry, using the product metadata to identify a product category by querying one or more product tables, and, if no product category is identified from the product table(s), inputting one or more product attributes into a machine-learning model to obtain a product category in substantially real time. After identifying a product category, the system adds the product to the checklist under the identified product category, determines if the addition of the product to the registry completes a checklist category, and updates the registry checklist to reflect completion of the checklist category, including visually in a user interface.

21 Claims, 7 Drawing Sheets

(56) References Cited

U.S. PATENT DOCUMENTS 8,751,281 B2 6/2014 Chaushev
9,269,103 B1 2/2016 Kumar et al.
9,760,936 B1 * 9/2017 Shaw ................ G06Q 30/0633
9,787,521 B1 10/2017 Boynes
10,650,433 B2 5/2020 Agarwal et al.
10,776,750 B2 9/2020 Lindbo et al.
10,783,151 B1 9/2020 Bushkin et al.
11,244,376 B1 2/2022 Van Thomme
11,295,364 B1 4/2022 Flanagan et al.
11,743,353 B1 8/2023 Flanagan et al.
11,868,934 B1 1/2024 Mandal et al.
2001/0039519 A1 * 11/2001 Richards ............ G06Q 30/0206 705/26.7
2002/0042775 A1 * 4/2002 Nelson .................. G06Q 10/02 705/5
2002/0133387 A1 9/2002 Wilson et al.
2003/0066093 A1 4/2003 Cruz-Rivera et al.
2003/0131021 A1 7/2003 Wight et al.
2004/0225605 A1 * 11/2004 Rowe .................. G07F 17/3281 705/39
2004/0254855 A1 12/2004 Shah
2007/0204308 A1 8/2007 Nicholas et al.
2007/0299736 A1 12/2007 Perrochon et al.
2008/0040240 A1 * 2/2008 Covington ......... G06Q 30/0633 705/26.8
2008/0172304 A1 7/2008 Berkowitz
2008/0288332 A1 11/2008 Altounian et al.
2009/0099941 A1 4/2009 Berkowitz
2009/0164340 A1 6/2009 Lluch
2009/0216549 A1 8/2009 Causey et al.
2010/0287256 A1 11/2010 Neilio
2010/0299194 A1 * 11/2010 Snyder ............... G06Q 30/0211 705/14.23
2011/0016023 A1 * 1/2011 Zakas ................ G06Q 30/0603 705/26.8
2011/0029370 A1 * 2/2011 Roeding ................. H04L 67/52 705/14.38
2011/0178924 A1 * 7/2011 Briscoe ................ G06Q 20/409 705/41
2011/0184855 A1 7/2011 Webber et al.
2011/0185390 A1 7/2011 Faenger et al.
2011/0264460 A1 10/2011 Jagemann et al.
2011/0311164 A1 * 12/2011 Badharudeen ..... G06Q 20/3278 235/383
2011/0320437 A1 12/2011 Kim et al.
2012/0030067 A1 2/2012 Pothukuchi et al.
2012/0150728 A1 * 6/2012 Isaacson ............ G06Q 30/0215 705/39
2012/0150882 A1 6/2012 Deutsch
2012/0226614 A1 * 9/2012 Gura ...................... G06Q 20/12 705/44
2013/0024452 A1 1/2013 Defusco et al.
2013/0031017 A1 1/2013 LaVoie et al.
2013/0054404 A1 2/2013 Garcia
2013/0073369 A1 * 3/2013 Begum .............. G06Q 30/0208 705/26.1
2013/0096997 A1 * 4/2013 Benedikt ............ G06Q 30/0605 705/26.8
2013/0117151 A1 5/2013 Macaisa et al.
2013/0132294 A1 * 5/2013 Schvey .................. G06Q 10/40 705/319
2013/0166445 A1 * 6/2013 Isaacson .............. G06Q 20/105 705/41
2013/0179268 A1 * 7/2013 Hu ..................... G06Q 30/0269 705/14.66
2013/0211890 A1 * 8/2013 Heitmueller ....... G06Q 30/0253 705/14.24
2013/0282573 A1 * 10/2013 Mullen ............. G06K 19/0725 705/41
2014/0012765 A1 1/2014 Kruglick
2014/0019267 A1 1/2014 Stoliartchouk et al.
2014/0019283 A1 * 1/2014 Daley .................... G06Q 30/06 705/26.2
2014/0279207 A1 * 9/2014 Agarwal ............ G06Q 30/0633 705/26.7
2014/0358662 A1 * 12/2014 De Luca ............ G06Q 30/0226 705/14.27
2015/0149298 A1 * 5/2015 Tapley ............... G06Q 30/0633 705/14.66
2016/0042438 A1 2/2016 Robertson
2016/0055563 A1 * 2/2016 Grandhi ............. G06Q 30/0625 705/26.62
2016/0140519 A1 5/2016 Trepca et al.
2016/0188606 A1 6/2016 Bandyopadhyay et al.
2016/0188725 A1 6/2016 Wang et al.
2016/0328787 A1 11/2016 Szulczewski et al.
2017/0039578 A1 2/2017 Woddi et al.
2017/0076349 A1 3/2017 Rohach Miller et al.
2017/0098284 A1 4/2017 Schneider
2017/0193591 A1 7/2017 Narasimhan et al.
2017/0206500 A1 7/2017 Deshpande et al.
2017/0270572 A1 9/2017 Schydlowsky
2018/0005304 A1 1/2018 Amacker et al.
2018/0181873 A1 6/2018 Chen
2018/0240066 A1 8/2018 Streebin et al.
2018/0314999 A1 11/2018 Nemati et al.
2019/0057145 A1 2/2019 Huang et al.
2019/0080307 A1 3/2019 Katzin et al.
2020/0410025 A1 12/2020 Arunmozhi et al.
2021/0166061 A1 6/2021 Tapley et al.
2022/0067976 A1 * 3/2022 Gershon ............ G06Q 30/0631
2022/0114868 A1 * 4/2022 Bronicki ............ G06Q 30/0623
2023/0214910 A1 7/2023 Vacante et al.
2023/0245055 A1 8/2023 Kang et al.
2023/0281672 A1 9/2023 Kobayashi et al.
2024/0029011 A1 1/2024 Stroh et al.
2024/0070603 A1 2/2024 Putrevu et al.
2024/0354635 A1 10/2024 Davaloo et al.
2024/0362583 A1 10/2024 Natarajan et al.

OTHER PUBLICATIONS

De Vos, Bob D., et al. "End-to-end unsupervised deformable image registration with a convolutional neural network." International Workshop on Deep Learning in Medical Image Analysis. Cham: Springer International Publishing, 2017. (Year: 2017).*

Pathak, Bhavik K. "Comparison Shopping Agents and Online Price Dispersion: A Search Cost based Explanation", Journal of Theoretical and Applied Electronic Commerce Research, vol. 7, Issue 1, Apr. 2012, pp. 64-76.

zola.com, FAQs (registry, receiving gifts): "How and when will we actually receive our gifts at home?", Jun. 1, 2023, 1 page.

Team Hopstack "Top 24 Warehouse KPIs & Metrics to Track in 2025", Jun. 7, 2023 (available at: https://www.hopstack.io/blog/warehouse-metrics-kpis) (Year: 2023), 13 pages.

Liu, Yew-Huey et al., "Collaborative Gift Registry in Multi-Channel Retail Commerce", Proceedings of the 7th IEEE International Conference on E-Commerce Technology, 2005, pp. 1-5.

* cited by examiner

SYSTEM, METHOD, AND COMPUTER PROGRAM FOR MAINTAINING A CHECKLIST FOR A REGISTRY THAT ALLOWS THE ADDITION OF PRODUCTS FROM MULTIPLE UNRELATED MERCHANT SITES

BACKGROUND OF THE INVENTION

1. Field of the Invention

This invention relates generally to registry systems and, more specifically, to a system and method for maintaining a checklist for a registry that allows the addition of products from multiple unrelated merchant sites.

2. Description of the Background Art

A registry, or gift list, is available through almost any merchant. While typically associated with weddings and new babies, a registry can be created for almost any occasion or no occasion at all. In creating a registry, a recipient can guide gift givers as to what the recipient needs or wants. In many cases, however, a recipient may not know what he or she needs or wants, but a checklist in a registry offers a structured way to research and add essential items. Traditionally, a registry and associated checklist would be created for a particular merchant, which enables the merchant to define the process by which the registry and checklist are created, categorized, and completed.

While a one-to-one relationship between a registry/checklist and a merchant may have made sense in the past in the context of people going to a physical store or logging in to a single online marketplace to shop. It, however, does not make sense now as people purchase products from many different venues, both in store and online. But consolidating the products from multiple unrelated merchants into one registry/checklist is complex. For example, none of the product information, including product category, from multiple unrelated merchants is standardized.

When a registry/checklist is maintained by a single entity, the process of categorizing products is simple. The individual merchant can organize the registry according to the merchant's own system, for example, based on the merchant's departments. Because the quantity of products is limited to their business, it is not unreasonable for the merchant to categorize its products manually. The result is each merchant has a different product categorization.

While an individual merchant may be able to categorize its products manually, it would be near impossible to manually categorize the products of multiple unrelated merchants and to provide the categorizations in substantially real time. Therefore, there is a need for a system and method for maintaining a checklist for a registry that allows the addition of products from multiple unrelated merchant sites and provides registry functionality for the products from multiple unrelated merchant sites, such as automatically determining the products' categories in substantially real time and adjusting the checklist based on the added products.

SUMMARY OF THE DISCLOSURE

The present disclosure describes a system, method, and computer program for maintaining a checklist for a registry that allows the addition of products from multiple unrelated merchant sites. In response to a user adding a product to the registry, the system obtains product metadata, which it uses to identify a product category. The product is added to the checklist under the identified product category and the system determines whether the addition of the product to the registry completes a checklist category. If so, the registry checklist is updated to reflect completion of the checklist category and a visual indication of the completion is provided in a user interface for the checklist. The method is performed by a computer system that includes servers, storage systems, networks, operating systems, and databases.

In one embodiment, a method for maintaining a checklist for a registry that allows the addition of products from multiple unrelated merchant sites comprises the following steps:

- enabling a user to add products from a plurality of unrelated merchant sites to a registry;
- providing a registry checklist having a plurality of different product categories;
- maintaining the checklist for the user by performing the following:
  - in response to a user adding a product to the registry, obtaining product metadata;
  - using the product metadata to identify a product category by performing the following:
    - querying one or more product tables using lookup data from the metadata to identify a product category for the item;
    - if no product category is identified from the one or more product tables, inputting one or more attributes of the product into a machine-learning model to obtain a product category in substantially real time, wherein the machine-learning model is trained to predict a category for a product in response to receiving one or more attributes of a product;
  - after identifying a product category for the product, adding the product to the checklist under the identified product category;
  - determining if the addition of the product to the registry completes a checklist category; and
  - in response to determining that the addition of the product completes a checklist category, updating the registry checklist to reflect completion of the checklist category, including providing a visual indication of the completion in a user interface for the checklist.

DETAILED DESCRIPTION OF THE PREFERRED EMBODIMENTS

The present disclosure describes a system, method, and computer program for maintaining a checklist for a registry that allows the addition of products from multiple unrelated merchant sites. The method is performed by a computer system that includes servers, storage systems, networks, operating systems, and databases ("the system").

The system enables a user to add products from a plurality of unrelated merchant sites to a registry and provides a registry checklist having a plurality of different product categories. The system maintains the checklist for the user by obtaining product metadata in response to a user adding a product to the registry, using the product metadata to identify a product category by querying one or more product tables, and, if no product category is identified from the product table(s), inputting one or more product attributes into a machine-learning model to obtain a product category in substantially real time. After identifying a product category, the system adds the product to the checklist under the identified product category, determines if the addition of the product to the registry completes a checklist category, and updates the registry checklist to reflect completion of the checklist category, including visually in a user interface.

Example implementations of the method are described in more detail with respect to FIGS. 1A-5.

Figure 1A:
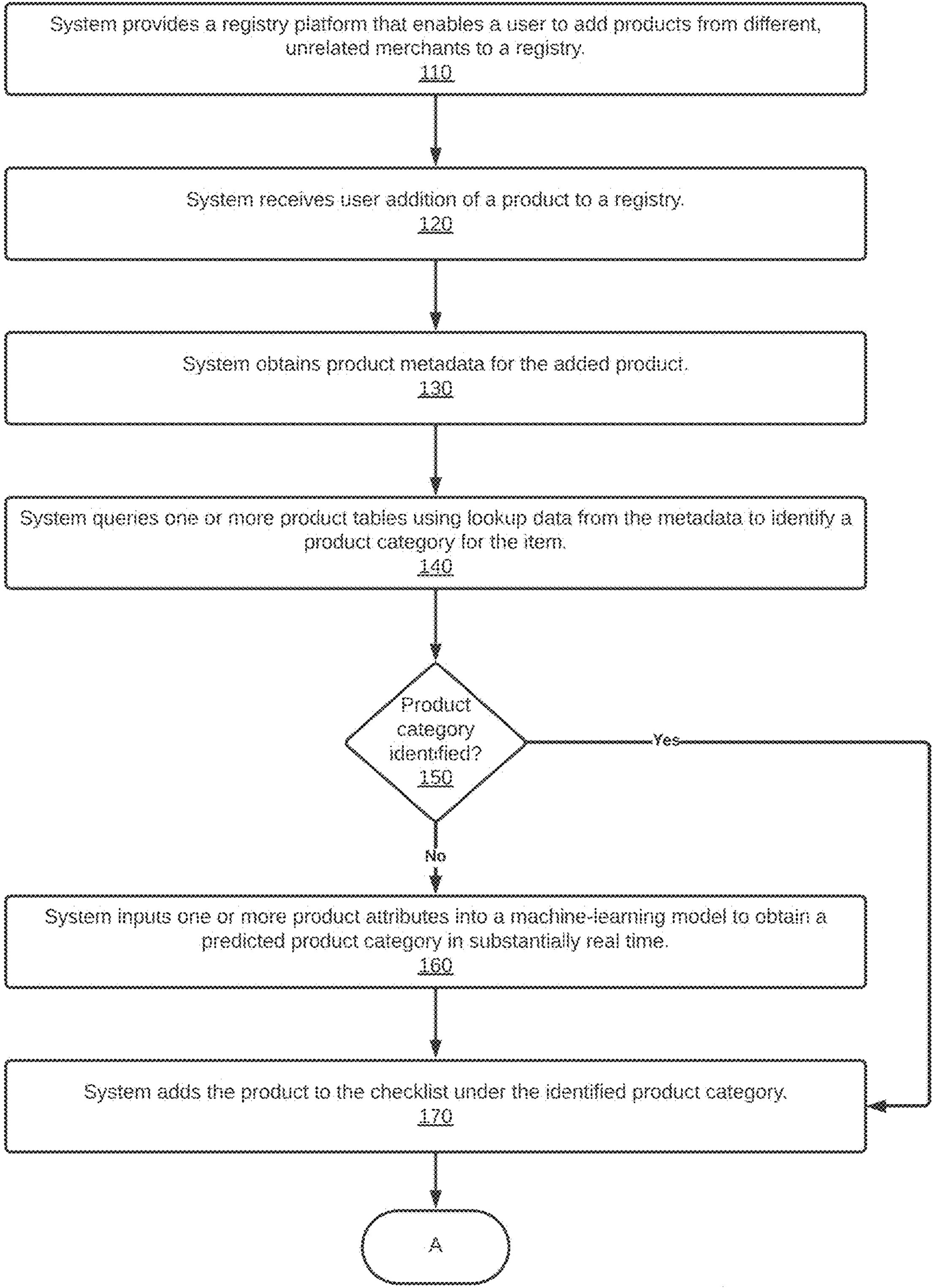
FIGS. 1A-1B are flowcharts that illustrate a method, according to one embodiment, for maintaining a checklist for a registry with products from multiple unrelated merchant sites.
Figure 1B:
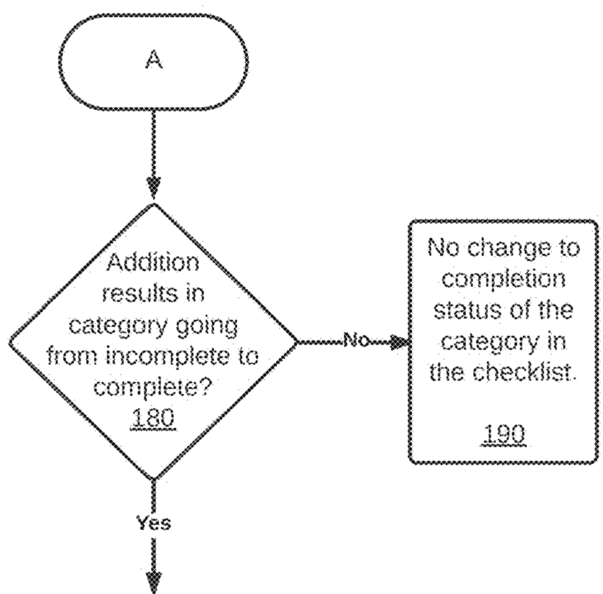

1. Method for Maintaining a Checklist for a Registry with Products from Multiple Unrelated Merchant Sites FIGS. 1A-1B illustrate a method for maintaining a checklist for a registry that allows the addition of products from multiple unrelated merchant sites. The system provides a registry platform that enables a user to add products from different, unrelated merchants to a registry (step 110). The registry platform includes a registry checklist, which the system maintains for the user, having a plurality of different product categories. The system received user addition of a product to a registry (step 120). In certain embodiments, the user may add a product to the registry from a merchant site using a browser extension or mobile application. The system obtains product metadata for the added product (step 130).

The system uses the product metadata to identify a product category by querying one or more product tables using lookup data from the metadata to identify a product category for the item (step 140). The system determines whether the product category has been identified (step 150). If no product category is identified from the one or more product tables, the system inputs one or more product attributes into a machine-learning model to obtain a predicted product category in substantially real time (step 160). A person skilled in the art would understand that substantially real time would be in the range of a few seconds or less. The machine-learning model is trained to predict a product category in response to receiving one or more product attributes. After identifying a product category for the product in step 150 or step 160, the system adds the product to the checklist under the identified product category (step 170).

The system then determined whether the addition of the product to the registry completes a checklist category (i.e., addition results in the category going from incomplete to complete) (step 180). Completing a checklist category means that at least the minimum quantity of items needed to fulfill the checklist category have been added to the checklist. In response to determining that the addition of the product completes a checklist category (i.e., addition results in the category going from incomplete to complete), the system updates the registry checklist to reflect completion of the checklist category, including providing a visual indication of the completion in a user interface for the checklist (step 185). Otherwise, there is no change to the completion status of the category in the checklist (step 190). For example, if the system has already updated the registry checklist to reflect completion of a checklist category, but more items are added to the checklist category, the completion status of the category in the checklist will remain unchanged. Or, if the category requires a minimum number of registry items, the addition of a product may not result in a change in the completion status until the minimum number of registry items have been added.

1.1 Product Tables

As discussed in step 140 above, the system first tries to categorize the product by querying lookup data in one or more product tables that map certain product metadata to a product category. In certain embodiments, the one or more product tables include a manually-populated table (i.e., manually-populated by a merchandizing team based on the most popular products added to registries) that maps product identification (ID), universal resource locator (URL), global trade item number (GTIN), and any merchant-specific identifier data to product categories. For the manually-populated table, each attribute can be associated with multiple categories. The system queries the attributes in the manually-populated table in a specific order (e.g., in order—product ID, URL, GTIN, and merchant-specific identifier). If there is a match for an attribute, the system selects the best or preferred option, for example, the category that was first (chronologically) associated with the attribute. Once there is a match for an attribute, the system does not query the remaining attributes.

In certain embodiments, the one or more product tables include a dynamic table that is system-populated based on output from a machine-learning model that categorizes products based on one or more product attributes (e.g., the title of the product), where, products categorized by the machine-learning model are added to the dynamic table such that the dynamic table grows with the use of the machine-learning model, and where the dynamic table maps product metadata to product categories. For the dynamic table, each attribute can be associated with multiple categories, similar to the manually-populated table described above, or each attribute can be associated with a single category. The system queries the attributes in the dynamic table in a specific order (e.g., in order-product ID, merchant-specific identifier, and GTIN). If there is a match for an attribute, the system selects the best or preferred option, for attributes associated with multiple categories, or the system selects the category that is associated with the attribute, for attributes associated with a single category. Once there is a match for an attribute, the system does not query the remaining attributes.

A dynamic table stabilizes the output from the complete historical categorization (see section 1.2 for details on how the machine-learning model outputs the complete historical categorization). For example, most additions to a registry come from a small group of products. If a particular product has thousands of additions at one time or the title is unconventional, the results may erroneously impact many items. For every product ID that has more than x additions within a window of time (e.g., 30 additions), the system will instead record the mode or the most popular categorization. The dynamic table is then rebuilt periodically by looking at the complete historical categorization for every product to use the most frequent historical categorization.

In certain embodiments, in ascertaining a product category for a product, the system queries the manually-populated table first (i.e., manual inference) and, if no category is identified from the manually-populated table, the system then queries the system-populated dynamic table (i.e., smoothed inference). More specifically, using the lookup data, the system queries the manually-populated table by product ID, URL, GTIN, and lastly, any merchant-specific identifier. The first query that returns as a category is deemed the category for the product and the registry checklist is updated accordingly. If the product category cannot be found using the manually-populated table, the system queries a dynamic table built through scheduled updates (e.g., nightly) from the results of a machine-learning model. The dynamic table is queried in order by product ID, any merchant-specific identifier, and then GTIN. The first query that returns as a category is deemed the category for the product and the registry checklist is updated accordingly.

While querying a manually-populated table increases accuracy and querying a dynamic table increases efficiency and decreases required resources, a person of skill in the art would understand that the claimed method may include one or both or none of these steps.

1.2 Machine-Learning Model

As discussed in step 160 above, if the system cannot obtain the category from the manually-populated table or from the system-populated dynamic table, the system will then use a machine-learning model (i.e., real-time inference).

In certain embodiments, the one or more input attributes to the machine-learning model include a cleansed version of a product title associated with the product. In certain embodiments, the one or more input attributes to the machine-learning model also include a product brand and a navigation breadcrumb.

In certain embodiments, the machine-learning model is trained using a training dataset that includes the following data for each product in the dataset: product category, product title, product brand, and navigation breadcrumb, where, if more than x product titles exist for a product, the machine-learning model is trained with only the x more common titles, where x is a positive integer. For example, the positive integer x may be 10, 25, 50, 100, etc. A person skilled in the art would understand that the machine-learning model may be trained using a training dataset that includes more, less, or different data for each product in the dataset. For example, the machine-learning model may be trained using a training dataset that includes image data for each product in the dataset.

One example of a machine-learning model that can perform the described method is the AMAZON BLAZINGTEXT algorithm, which is a wrapper for a recurrent neural network (RNN). A person skilled in the art would understand that this example is one embodiment and other embodiments may be used within the scope of the invention.

This model is trained using a matrix of features and labels. A feature is information about the data that the system is trying to extract. In this case, the feature combines the brand, navigation breadcrumb, and title of each registry item associated with a known product and, thus, a known checklist category. The label is the output. In this case, it is the registry checklist category.

To train the model, tens of thousands of existing products were used. For each product, there was a known registry checklist category. This became the training matrix. The training matrix was then plugged into a black box algorithm to determine patterns that connect the features to the labels. This produced a model output that enables a user to provide new unlabeled inputs and receive assigned labels (i.e., real-time inference).

The features are cleansed before training and inference. For example, by using a simple process of downcasing, removing punctuation, special characters, extra whitespace, stop words, and then lemmatizing the result. This is the same cleansing process that is used when doing real-time inference.

The model is retrained nightly by looking at the last x days of registry items (e.g., 60 days) for y known products (e.g., 10,000 known products). If more than z different titles exist for a given product (e.g., 50 different titles), the training data set is constructed with only the z most common (e.g., 50 most common). After retraining the model, there is a nightly process that pulls registry items that were added since the last time the model was trained (e.g., the last 24 hours of registry items) and categorizes them. This builds a full, historical categorization of every registry item.

The retrained algorithm is provided through scheduled updates (e.g., every hour, every 12 hours, every day, every week, etc.) to the machine-learning model and the data from the retrained algorithm is provided through scheduled updates (e.g., every hour, every 12 hours, every day, every week, etc.) to the dynamic table, which is discussed further in section 1.1.

1.3 Additional Embodiments

In certain embodiments, the product metadata is obtained by scraping data from the merchant's webpage and comprises at least one of product ID, URL, GTIN, any merchant-specific identifier, product title, product brand, navigation breadcrumb, UPC, SKU, ISBN, etc. In certain embodiments, if the system cannot obtain at least one of product ID, URL, GTIN, and any merchant-specific identifier, the product is added to the registry, but is not categorized, and the addition of the product to the registry does not change the checklist.

In certain embodiments, in response to a user adding a product to the registry, the system filters out ineligible products prior to obtaining product metadata from eligible products. For example, ineligible products may include a cash fund, a link to an external registry, a gift card, etc.

In certain embodiments, a user may manually mark a category as complete in the user interface and the manually-marked completion status overrides the system-derived completion status. In certain embodiments, the method further comprises: receiving an indication of a product being removed from the registry, determining that the removal of the product changes the checklist category from complete to incomplete, and updating the checklist to reflect the checklist category is incomplete. For example, if a checklist category has four registry items. The user previously added all four registry items to the registry, thus completing the checklist category. But then the user removes one of the four registry items from the registry. The system would determine that the removal of the one registry item changes the checklist category from complete to incomplete and would update the checklist to reflect that the checklist category is incomplete.

2. Exemplary Implementation of Method

Figure 2A:
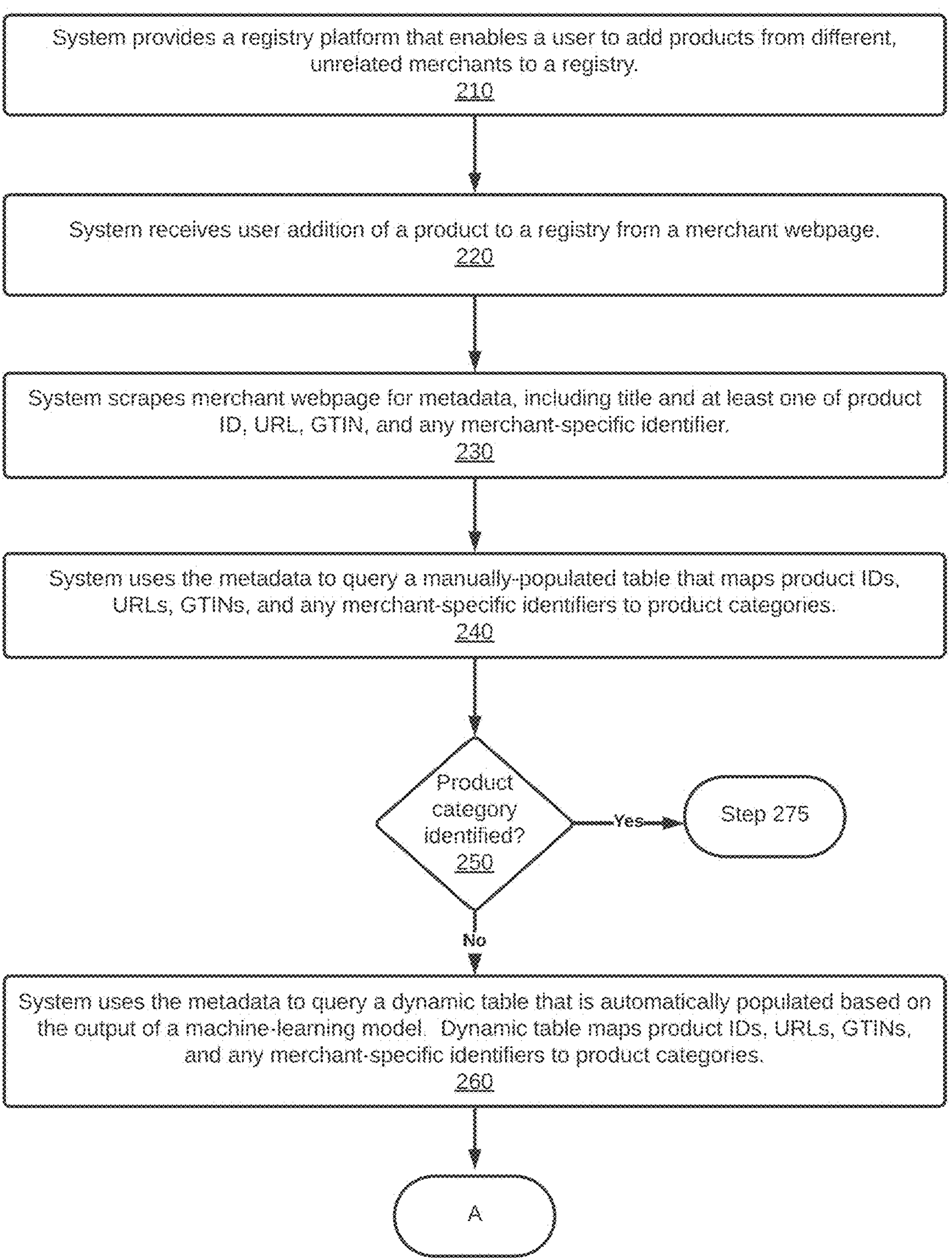
FIGS. 2A-2B are flowcharts that illustrate an exemplary implementation of the method illustrated in FIGS. 1A-1B.
Figure 2B:
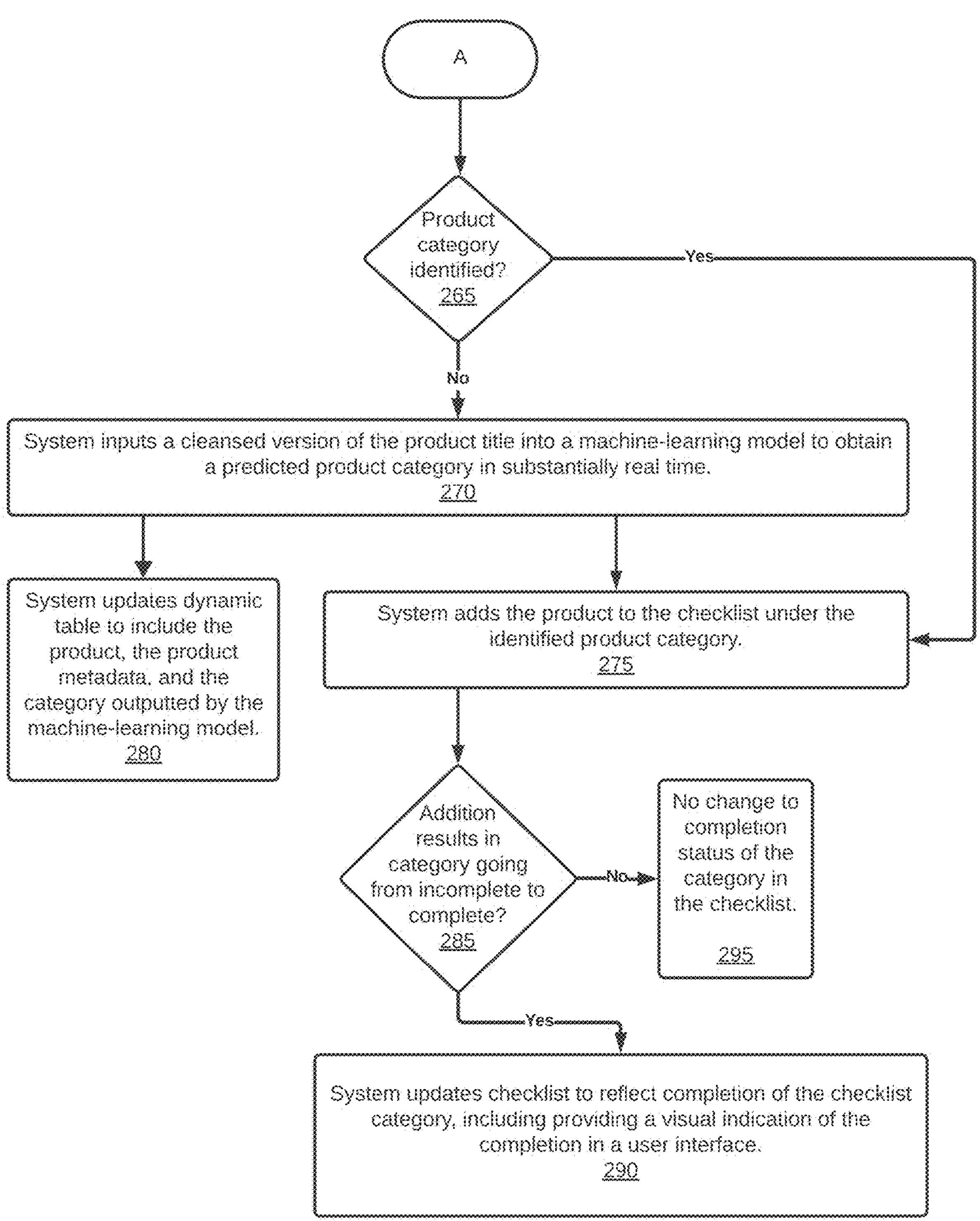

FIGS. 2A-2B illustrate an exemplary implementation of the method illustrated in FIGS. 1A-1B. The system provides a registry platform that enables a user to add products from different, unrelated merchants to a registry (step 210). The system receives user addition of a product to a registry from a merchant webpage (step 220). The system scrapes the merchant webpage for metadata, including the product title and at least one of product ID, URL, GTIN, and any merchant-specific identifier (step 230). The system uses the metadata to query a manually-populated table that maps product IDs, URLs, GTINs, and any merchant-specific identifiers to product categories (step 240).

The system then determines whether the product category was identified (step 250). If the product category was not identified, the system uses the metadata to query a dynamic table that is automatically populated based on the output of a machine-learning model (step 260). The dynamic table maps product IDs, URLs, GTINs, and any merchant-specific identifiers to product categories. If the system determines that the product category was identified in step 250 or step 265, the system adds the product to the checklist under the identified product category (step 275).

If the system determined that the product category was not identified, the system inputs a cleansed version of the product title into a machine-learning model to obtain a predicted product category in substantially real time (step 270). The system then adds the product to the checklist under the identified product category (step 275) and updates the dynamic table to include the product, the product metadata, and the category outputted by the machine-learning model (step 280). Step 280 may be performed in real time or at a later time.

The system then determines if the addition of the product completes a checklist category (i.e., addition results in the category going from incomplete to complete) (step 285). If the system determines that the addition of the product completes a checklist category (i.e., addition results in the category going from incomplete to complete), the system updates the checklist to reflect completion of the checklist category, including providing a visual indication of the completion in a user interface (step 290). Otherwise, there is no change to the completion status of the category in the checklist (step 295).

3. Example System Architecture

Figure 3:
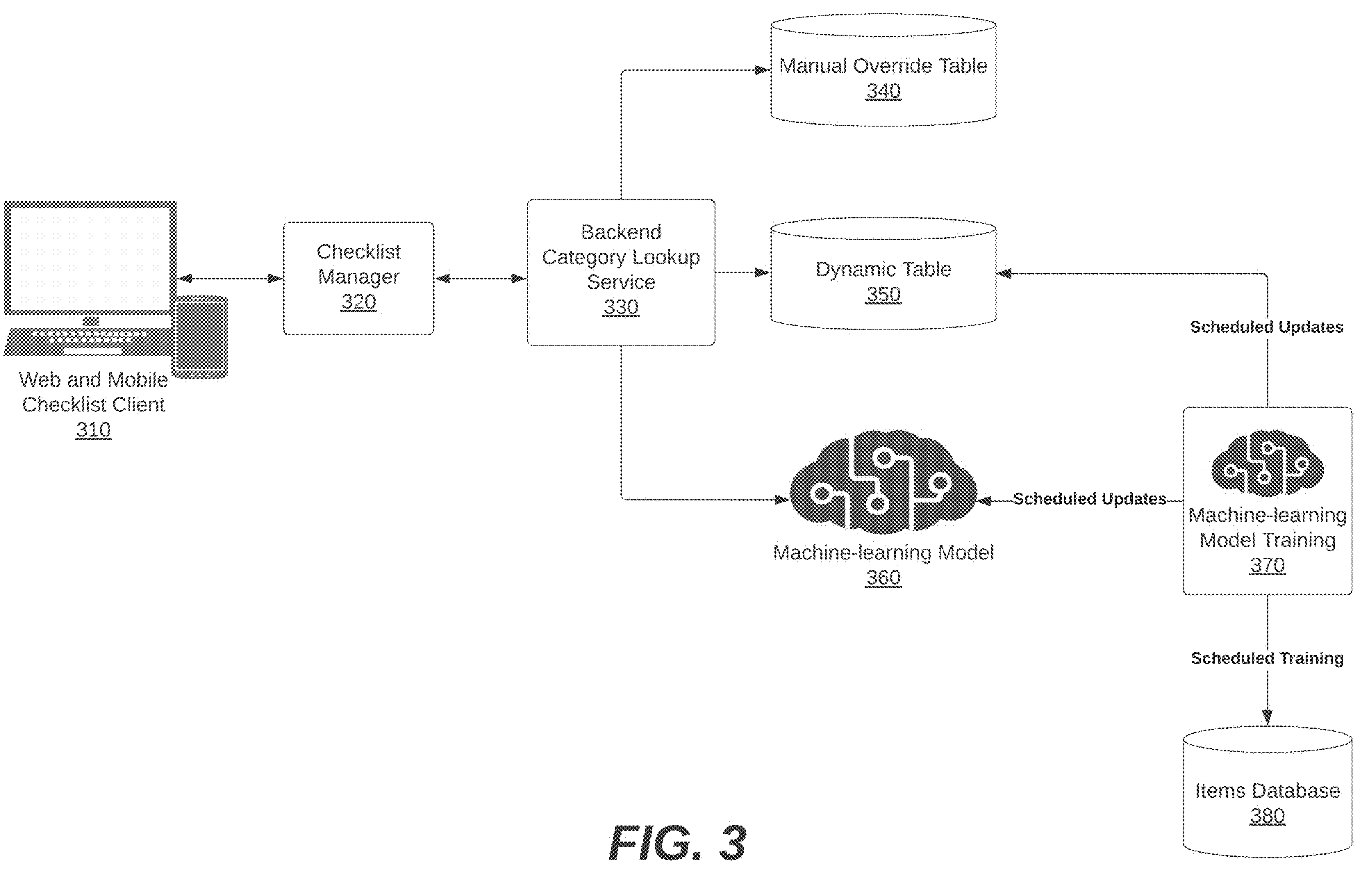
FIG. 3 is a block diagram that illustrates an example system architecture according to one embodiment.

FIG. 3 illustrates an example architecture for a system that performs the methods described herein. However, the methods described herein may be implemented in other systems and are not limited to the illustrated system.

The system includes a web and mobile checklist client 310 that enables a user to add products from multiple unrelated merchants to a registry and includes a user interface for displaying the registry organized by category with a checklist function. The checklist manager 320, which runs on a server, maintains the registry checklist and updates the web and mobile checklist client 310 when there is an update to the checklist. When the user adds a product to the registry, the web and mobile checklist client 310 sends the added product to the checklist manager 320, which, in turn, calls the backend category lookup service 330. The backend category lookup service 330 tries to identify the category of the product by first checking a manual override table 340, then checking a dynamic table 350, and finally checking the machine-learning model 360. If there is a match in one of the manual override table 340, dynamic table 350, or machine-learning model 360, the system accepts the determination and ceases to look up the subsequent table or model. Once the backend category lookup service 330 identifies the category of the product, it sends the identification to the checklist manager 320, which updates the maintained registry and checklist and send the updated registry and checklist back to the web and mobile checklist client 310.

The machine-learning model training 370 performs scheduled training using the items in the items database 380. In certain embodiments, the scheduled training can be every half hour, every hour, every three hours, every six hours, every 12 hours, every 24 hours, every week, etc. It then sends updated data to the dynamic table 350 and updated model information to the machine-learning model 360. The scheduled updates for the dynamic table 350 and for the machine-learning model 360 can be every half hour, every hour, every three hours, every six hours, every 12 hours, every 24 hours, every week, etc. The scheduled updates for the dynamic table 350 and the machine-learning model 360 can be on the same schedule or on different schedules.

4. Example Screenshots of User Interface

Figure 4:
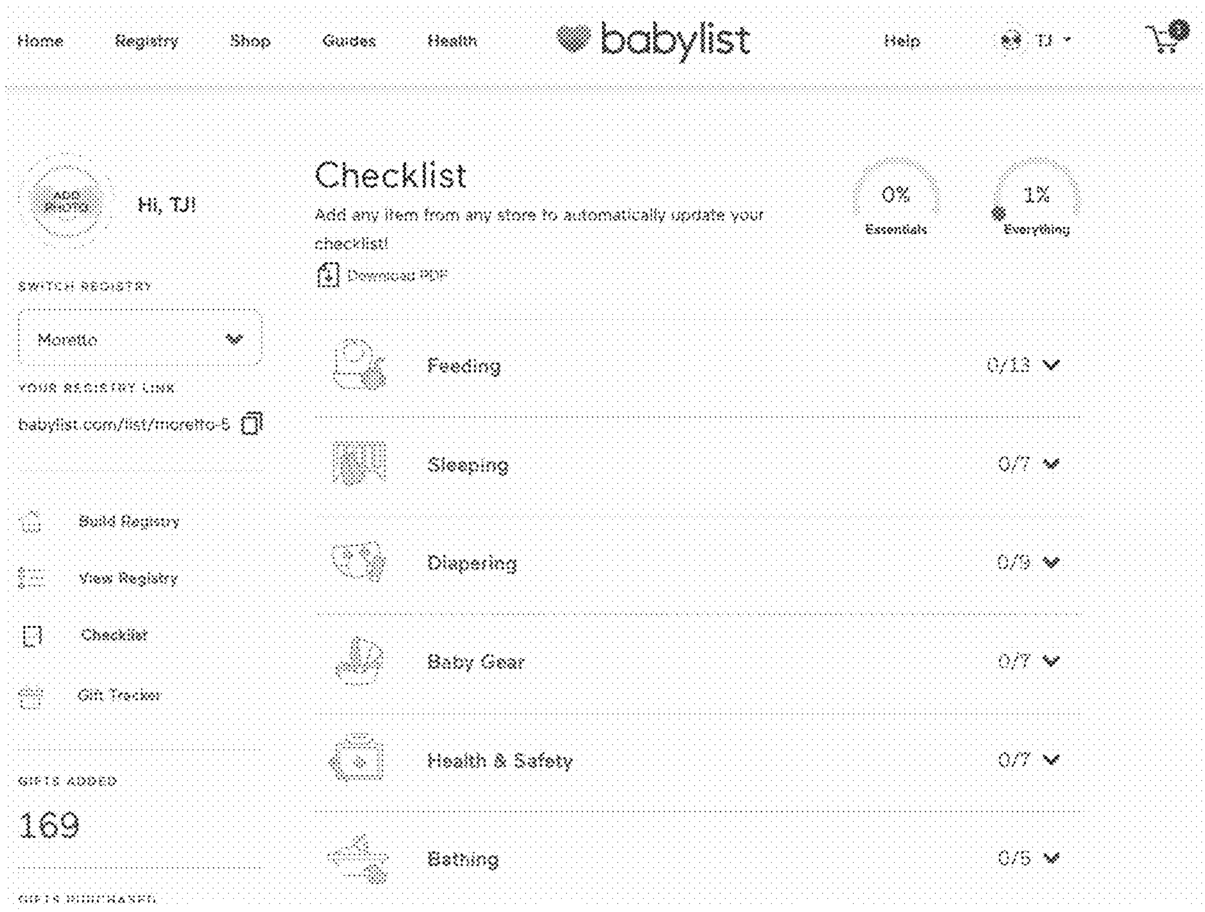
FIGS. 4-5 are screenshots of an exemplary user interface in a registry system according to one embodiment.
Figure 5:
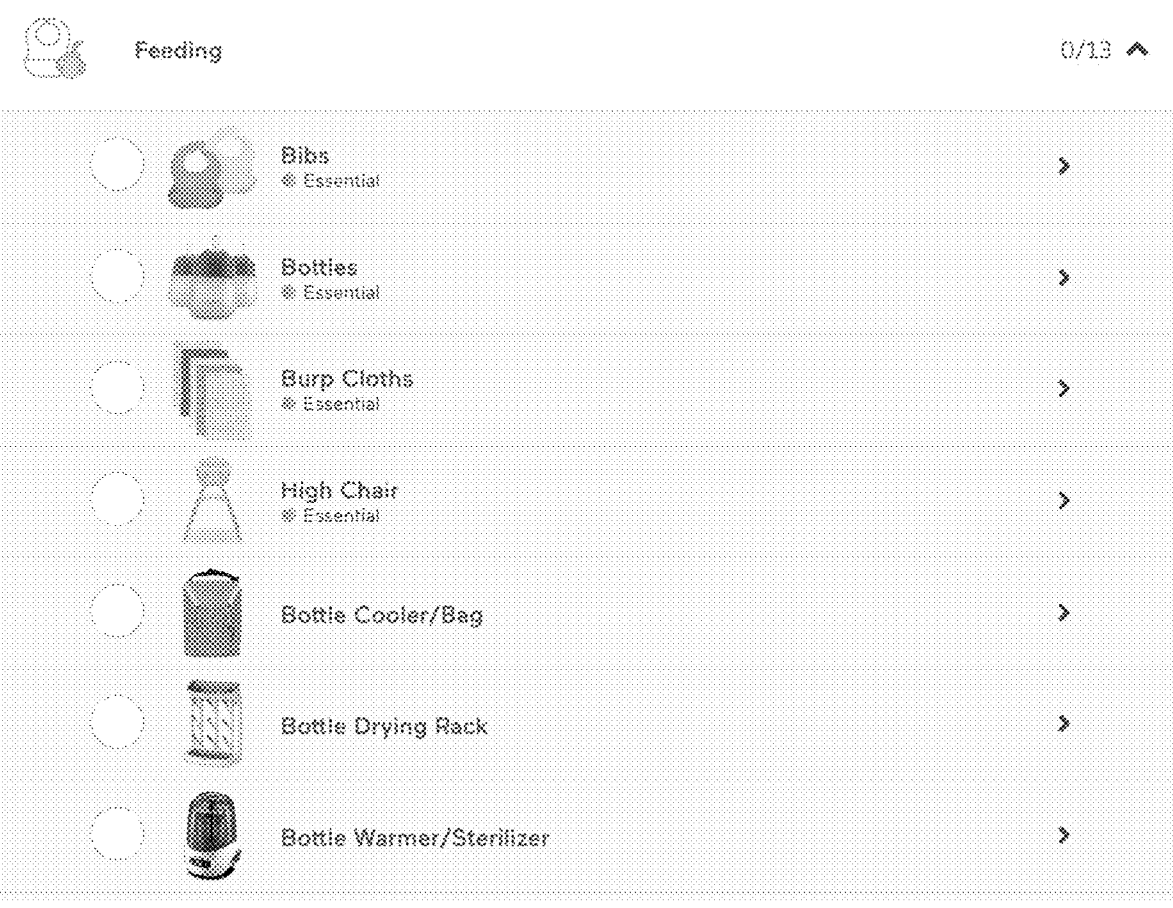

FIGS. 4-5 illustrate screenshots of an exemplary user interface in a registry system according to one embodiment. A person skilled in the art would understand that the present invention may be embodied in other user interfaces having more or less functionality within the scope of the present invention. As such, FIGS. 4-5 are intended to be illustrative and not limiting in any way.

The checklist starts as an empty list of product categories to be used as a guide for building out a registry. In this case, it is a baby registry, but the registry may be any type of gift list. Each category has a specific set of items and quantities that one should look to include on the registry. There are essential items and nice-to-have items. As a customer builds his or her registry, the system automatically checks off the items in his or her list. Items can be added to the registry from many different places (e.g., multiple unrelated merchants, content feed of online publishers, etc.).

When a product is added to the registry, the system first obtains product metadata and uses the product metadata to determine if the product has a known category assigned to it, for example, by querying a manually-populated table and/or a dynamic table as discussed above with respect to FIGS. 1-3. If yes, the product is assigned to this category. If not, the product metadata is sent to a machine-learning model to determine the most appropriate category. The product is then added to the registry under the assigned or most appropriate category and the user interface is updated to reflect the addition and, if relevant, the completion of the category.

FIG. 4 illustrates six categories: feeding, sleeping, diapering, baby gear, health & safety, and bathing. Within each category, the checklist includes a certain number of registry items. For example, when the user clicks on the feeding category in FIG. 4, the user interface displays a screen that shows 13 feeding registry items. As seen in FIG. 5, seven of the 13 feeding registry items are displayed: bibs, bottles, burp cloths, high chair, bottle cooler/bag, bottle drying rack, and bottle warmer/sterilizer. The first four feeding registry items are marked as essential, and the remaining feeding registry items are nice to have. When the user selects a high chair from a merchant site and adds the product to his or her registry, the system automatically checks off the high chair registry item in the checklist (if not previously checked off by a prior addition of a high chair to the registry) and marks the feeding category as having added a registry item. In certain embodiments, a category is marked as complete when all of the essential registry items in the category are checked off. In certain embodiments, a category is marked as complete when all of the registry items in the category, essential and nice to have, are checked off.

5. General

The methods described with respect to FIGS. 1A-5 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for maintaining a checklist for a registry that allows the addition of products from multiple unrelated merchant sites, the method comprising:

a web and mobile checklist client enabling a user to add products from a plurality of unrelated merchant sites to a registry, wherein the web and mobile checklist client includes a user interface for displaying the registry organized by category with a checklist function;

providing a registry checklist having a plurality of different product categories;

a checklist manager running on a server maintaining the checklist for the user by performing the following:

in response to a user adding a product to the registry, obtaining product metadata;

a backend category lookup service using the product metadata to identify a product category by performing the following:

querying one or more product tables using lookup data from the metadata to identify a product category for the product;

if no product category is identified from the one or more product tables, inputting one or more attributes of the product into a machine-learning model to obtain a product category in substantially real time, wherein the machine-learning model is trained to predict a category for a product in response to receiving one or more attributes of a product, wherein training the machine-learning model comprises plugging a training matrix into a training algorithm at regular intervals, wherein the training matrix comprises one or more attributes from a plurality of items in an items database including a product category, a product title, a product brand, and/or a navigation breadcrumb, and wherein after each training of the machine-learning model, any product(s) added to the registry since a previous training of the machine-learning model is categorized by the machine-learning model to build a historical categorization;

after the backend category lookup service identifying a product category for the product, the checklist manager adding the product to the checklist under the identified product category;

the checklist manager determining if the addition of the product to the registry completes a checklist category; and in response to determining that the addition of the product completes a checklist category, the checklist manager updating the registry checklist to reflect completion of the checklist category, including providing a visual indication of the completion in the user interface for the checklist.

2. The method of claim 1, wherein the one or more product tables include a manually-populated table that maps product ID, URL, GTIN, and any merchant-specific identifier data to product categories.

3. The method of claim 1, wherein, the one or more product tables include a dynamic table that is system-populated based on output of the machine-learning model, wherein, products categorized by the machine-learning model are added to the dynamic table such that the dynamic table grows with the use of the machine-learning model, wherein the dynamic table maps product metadata to product categories.

4. The method of claim 1, wherein the one or more product tables include:

a manually-populated table that maps product ID, URL, GTIN, and any merchant-specific identifier data to product categories; and a system-populated dynamic table that is populated based on output of the machine-learning model, wherein, products categorized by the machine-learning model are added to the dynamic table such that the dynamic table grows with the use of the machine-learning model, wherein the dynamic table maps product metadata to product categories;

wherein, in ascertaining a product category for a product, the system queries the manually-populated table first and, if no category is identified from the manually-populated table, the system then queries the system-populated dynamic table.

5. The method of claim 1, wherein the product metadata is obtained by scraping data from the merchant's webpage and comprises at least one of product ID, URL, GTIN, and any merchant-specific identifier.

6. The method of claim 5, wherein, if the system cannot obtain at least one of product ID, URL, GTIN, and any merchant-specific identifier, the product is not categorized and the addition of the product to the registry does not change the checklist.

7. The method of claim 1, wherein the one or more input attributes to the machine-learning model includes a cleansed version of a product title associated with the product.

8. The method of claim 1, wherein the machine-learning model is trained using a training dataset that includes the following data for each product in the dataset: product category, product title, product brand, and navigation breadcrumb, wherein, if more than x product titles exist for a product, the model is trained with only the x most common titles, where x is a positive integer.

9. The method of claim 1, wherein in response to a user adding a product to the registry, the system filters out ineligible products prior to obtaining product metadata from eligible products.

10. The method of claim 1, further comprising:

receiving an indication of a product being removed from the registry;

determining that the removal of the product changes the checklist category from complete to incomplete; and updating the checklist to reflect the checklist category is incomplete.

11. A non-transitory computer-readable medium comprising a computer program, that, when executed by a computer system, enables the computer system to perform the following steps for maintaining a checklist for a registry that allows the addition of products from multiple unrelated merchant sites, the steps comprising:

a web and mobile checklist client enabling a user to add products from a plurality of unrelated merchant sites to a registry, wherein the web and mobile checklist client includes a user interface for displaying the registry organized by category with a checklist function;

providing a registry checklist having a plurality of different product categories;

a checklist manager running on a server maintaining the checklist for the user by performing the following:

in response to a user adding a product to the registry, obtaining product metadata;

a backend category lookup service using the product metadata to identify a product category by performing the following:

querying one or more product tables using lookup data from the metadata to identify a product category for the product;

if no product category is identified from the one or more product tables, inputting one or more attributes of the product into a machine-learning model to obtain a product category in substantially real time, wherein the machine-learning model is trained to predict a category for a product in response to receiving one or more attributes of a product, wherein training the machine-learning model comprises plugging a training matrix into a training algorithm at regular intervals, wherein the training matrix comprises one or more attributes from a plurality of items in an items database including a product category, a product title, a product brand, and/or a navigation breadcrumb, and wherein after each training of the machine-learning model, any product(s) added to the registry since a previous training of the machine-learning model is categorized by the machine-learning model to build a historical categorization;

after the backend category lookup service identifying a product category for the product, the checklist manager adding the product to the checklist under the identified product category;

the checklist manager determining if the addition of the product to the registry completes a checklist category; and in response to determining that the addition of the product completes a checklist category, the checklist manager updating the registry checklist to reflect completion of the checklist category, including providing a visual indication of the completion in the user interface for the checklist.

12. The non-transitory computer-readable medium of claim 11, wherein the one or more product tables include a manually-populated table that maps product ID, URL, GTIN, and any merchant-specific identifier data to product categories.

13. The non-transitory computer-readable medium of claim 11, wherein, the one or more product tables include a dynamic table that is system-populated based on output of the machine-learning model, wherein, products categorized by the machine-learning model are added to the dynamic table such that the dynamic table grows with the use of the machine-learning model, wherein the dynamic table maps product metadata to product categories.

14. The non-transitory computer-readable medium of claim 12, wherein the one or more product tables include:

a manually-populated table that maps product ID, URL, GTIN, and any merchant-specific identifier data to product categories; and a system-populated dynamic table that is populated based on output of the machine-learning model, wherein, products categorized by the machine-learning model are added to the dynamic table such that the dynamic table grows with the use of the machine-learning model, wherein the dynamic table maps product metadata to product categories;

wherein, in ascertaining a product category for a product, the system queries the manually-populated table first and, if no category is identified from the manually-populated table, the system then queries the system-populated dynamic table.

15. The non-transitory computer-readable medium of claim 11, wherein the product metadata is obtained by scraping data from the merchant's webpage and comprises at least one of product ID, URL, GTIN, and any merchant-specific identifier.

16. The non-transitory computer-readable medium of claim 15, wherein, if the system cannot obtain at least one of product ID, URL, GTIN, and any merchant-specific identifier, the product is not categorized and the addition of the product to the registry does not change the checklist.

17. The non-transitory computer-readable medium of claim 11, wherein the one or more input attributes to the machine-learning model includes a cleansed version of a product title associated with the product.

18. The non-transitory computer-readable medium of claim 11, wherein the machine-learning model is trained using a training dataset that includes the following data for each product in the dataset: product category, product title, product brand, and navigation breadcrumb, wherein, if more than x product titles exist for a product, the model is trained with only the x most common titles, where x is a positive integer.

19. The non-transitory computer-readable medium of claim 11, wherein in response to a user adding a product to the registry, the system filters out ineligible products prior to obtaining product metadata from eligible products.

20. The non-transitory computer-readable medium of claim 11, further comprising:

receiving an indication of a product being removed from the registry;

determining that the removal of the product changes the checklist category from complete to incomplete; and updating the checklist to reflect the checklist category is incomplete.

21. A computer system for maintaining a checklist for a registry that allows the addition of products from multiple unrelated merchant sites, the system comprising:

one or more processors;

one or more memory units coupled to the one or more processors, wherein the one or more memory units store instructions that, when executed by the one or more processors, cause the system to perform the operations of:

a web and mobile checklist client enabling a user to add products from a plurality of unrelated merchant sites to a registry, wherein the web and mobile checklist client includes a user interface for displaying the registry organized by category with a checklist function;

providing a registry checklist having a plurality of different product categories;

a checklist manager running on a server maintaining the checklist for the user by performing the following:

in response to a user adding a product to the registry, obtaining product metadata;

a backend category lookup service using the product metadata to identify a product category by performing the following:

querying one or more product tables using lookup data from the metadata to identify a product category for the product;

if no product category is identified from the one or more product tables, inputting one or more attributes of the product into a machine-learning model to obtain a product category in substantially real time, wherein the machine-learning model is trained to predict a category for a product in response to receiving one or more attributes of a product, wherein training the machine-learning model comprises plugging a training matrix into a training algorithm at regular intervals, wherein the training matrix comprises one or more attributes from a plurality of items in an items database including a product category, a product title, a product brand, and/or a navigation breadcrumb, and wherein after each training of the machine-learning model, any product(s) added to the registry since a previous training of the machine-learning model is categorized by the machine-learning model to build a historical categorization;

after the backend category lookup service identifying a product category for the product, the checklist manager adding the product to the checklist under the identified product category;

the checklist manager determining if the addition of the product to the registry completes a checklist category; and in response to determining that the addition of the product completes a checklist category, the checklist manager updating the registry checklist to reflect completion of the checklist category, including providing a visual indication of the completion in the user interface for the checklist.

* * * * *